United States Patent
Eom et al.

(10) Patent No.: US 11,722,290 B2
(45) Date of Patent: Aug. 8, 2023

(54) METHOD AND APPARATUS FOR MODULUS REFRESH IN HOMOMORPHIC ENCRYPTION

(71) Applicant: Samsung Electronics Co., Ltd., Suwon-si (KR)

(72) Inventors: Jieun Eom, Hwaseong-si (KR); Andrey Kim, Suwon-si (KR); Deriabin Maksim, Suwon-si (KR); Rakyong Choi, Suwon-si (KR); Whan Ghang, Suwon-si (KR); Dong-Hoon Yoo, Suwon-si (KR); Yongwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 17/678,596

(22) Filed: Feb. 23, 2022

(65) Prior Publication Data
US 2022/0376890 A1 Nov. 24, 2022

(30) Foreign Application Priority Data

May 21, 2021 (KR) ........................ 10-2021-0065429
Aug. 26, 2021 (KR) ........................ 10-2021-0112965

(51) Int. Cl.
*H04L 29/06* (2006.01)
*H04L 9/00* (2022.01)
*H04L 9/08* (2006.01)
*H04L 9/30* (2006.01)

(52) U.S. Cl.
CPC .............. *H04L 9/008* (2013.01); *H04L 9/085* (2013.01); *H04L 9/3026* (2013.01)

(58) Field of Classification Search
CPC ....... H04L 9/008; H04L 9/085; H04L 9/3026; H04L 9/0891; H04L 9/3093
See application file for complete search history.

(56) References Cited

U.S. PATENT DOCUMENTS

| 9,083,526 B2* | 7/2015 | Gentry | ................. H04L 9/008 |
| 10,985,904 B2* | 4/2021 | Gentry | ............... G06F 21/6245 |
| 2014/0041039 A1* | 2/2014 | Saldamli | ............ G06F 21/6254 726/26 |
| 2020/0036511 A1* | 1/2020 | Cheon | ................. H04L 63/0428 |

OTHER PUBLICATIONS

Yasumura et al. "Secure Naive Bayes Classification Protocol over Encrypted Data Using Fully Homomorphic Encryption", iiWAS2019: Proceedings of the 21st International Conference on Information Integration and Web-based Applications & Services, Dec. 2019.*

(Continued)

*Primary Examiner* — Morshed Mehedi
(74) *Attorney, Agent, or Firm* — NSIP Law (57) ABSTRACT

Disclosed is a method and apparatus for modulus refresh, where the method for modulus refresh of a ciphertext in homomorphic encryption includes receiving a first ciphertext corresponding to a first modulus, generating a second ciphertext by performing a blind rotation on the first ciphertext, and generating a target ciphertext corresponding to a second modulus greater than the first modulus based on the first ciphertext and the second ciphertext.

22 Claims, 6 Drawing Sheets

(56) References Cited

OTHER PUBLICATIONS

Brakerski, Zvika, et al. "Fully Homomorphic Encryption without Bootstrapping." *ACM Transactions on Computation Theory (TOCT)* vol. 6 Issue 3, 2014 (27 pages in English).
Ducas, Léo, et al. "FHEW: Bootstrapping Homomorphic Encryption in less than a second." *Annual International Conference on the Theory and Applications of Cryptographic Techniques Springer*, Berlin, Heidelberg, 2015 (27 pages in English).
Cheon, Jung Hee, et al. "Bootstrapping for Approximate Homomorphic Encryption." *Annual International Conference on the Theory and Applications of Cryptographic Techniques.* Springer, Cham, 2018 (35 pages in English).
Carpov, Sergiu, et al. "New techniques for multi-value input homomorphic evaluation and applications." *Cryptographers' Track at the RSA Conference.* Springer, Cham, 2019 (20 pages in English).
Han, Kyoohyung, et al. "Better Bootstrapping for Approximate Homomorphic Encryption." *Cryptographers' Track at the RSA Conference.* Springer, Cham, 2020 (26 pages in English).
Chillotti, Ilaria, et al. "TFHE: Fast Fully Homomorphic Encryption over the Torus." *Journal of Cryptology* vol. 33 Issue 1 2020 (62 pages in English).

* cited by examiner

METHOD AND APPARATUS FOR MODULUS REFRESH IN HOMOMORPHIC ENCRYPTION

CROSS-REFERENCE TO RELATED APPLICATIONS

This application claims the benefit under 35 USC § 119(a) of Korean Patent Application No. 10-2021-0065429, filed on May 21, 2021, and Korean Patent Application No. 10-2021-0112965, filed on Aug. 26, 2021, in the Korean Intellectual Property Office, the entire disclosures, all of which, are incorporated herein by reference for all purposes.

BACKGROUND

1. Field

The following description relates to a method and apparatus for modulus refresh in homomorphic encryption supporting integers or real numbers.

2. Description of Related Art

Homomorphic encryption enables arbitrary operations between encrypted data. Homomorphic encryption is lattice-based and enables arbitrary operations on encrypted data without decrypting the encrypted data. Thus, homomorphic encryption is safer and resistant to quantum algorithms.

Since a modulus corresponding to a ciphertext, which is an encrypted text, decreases between encrypted data in homomorphic encryption, a modulus refresh process for restoring the modulus is needed.

Modulus refresh methods in the conventional homomorphic encryption represent a decryption algorithm as a circuit capable of homomorphic operations. The conventional modulus refresh methods include a method that approximates a modulus operation with a sine function and then performs an approximate polynomial operation close to the sine function, a method that directly approximates a modulus operation to have a low minimum error and variance without sine function approximation, and the like.

The conventional modulus refresh methods have low precision bits for an output value due to an approximate polynomial, when compared to existing ciphertext. When an approximate polynomial of a high order is used, a value of modulus obtained in the modulus refresh process is not large.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method for modulus refresh of a ciphertext in homomorphic encryption, the method including receiving a first ciphertext corresponding to a first modulus, generating a second ciphertext by performing a blind rotation on the first ciphertext, and generating a target ciphertext corresponding to a second modulus greater than the first modulus based on the first ciphertext and the second ciphertext.

The generating of the second ciphertext may include performing homomorphic operation-based preprocessing on the first ciphertext based on the first modulus and an order of a polynomial of the first ciphertext, and generating the second ciphertext by performing the blind rotation on the first ciphertext on which the homomorphic operation-based preprocessing is performed.

The performing of the homomorphic operation-based preprocessing on the first ciphertext may include determining a transformed first modulus by transforming the first modulus based on the order of the polynomial, generating a third ciphertext by transforming the first ciphertext based on the transformed first modulus, and preprocessing the first ciphertext based on the transformed first modulus and the third ciphertext.

The preprocessing of the first ciphertext based on the transformed first modulus and the third ciphertext may include preprocessing by dividing a difference between the first ciphertext and the third ciphertext by the transformed first modulus.

The generating of the second ciphertext by performing the blind rotation on the first ciphertext may include extracting a learning with error (LWE) vector based on a coefficient of the first ciphertext on which the homomorphic operation-based preprocessing is performed, and generating the second ciphertext by performing the blind rotation based on the LWE vector.

The method of claim 5, wherein the generating of the second ciphertext by performing the blind rotation based on the LWE vector may include generating an encryption constant based on a secret key used to generate the first ciphertext, generating a blind rotation key based on the encryption constant, and generating the second ciphertext by performing the blind rotation based on the blind rotation key.

The generating of the second ciphertext by performing the blind rotation based on the blind rotation key may include generating blind rotation ciphertexts corresponding to the blind rotation key according to the order of the polynomial of the first ciphertext, and generating the second ciphertext by combining the blind rotation ciphertexts.

The performing of the homomorphic operation-based preprocessing on the first ciphertext may include determining a transformed first modulus by transforming the first modulus based on the order of the polynomial, generating a third ciphertext by transforming the first ciphertext based on the transformed first modulus, and preprocessing the first ciphertext by performing a rotation operation on the third ciphertext at intervals that are based on a number of plaintexts.

The performing of the homomorphic operation-based preprocessing on the first ciphertext may include generating a transformed first ciphertext by transforming the first ciphertext based on the first modulus and the order of the polynomial, and preprocessing the first ciphertext based on the transformed first ciphertext.

The preprocessing of the first ciphertext based on the transformed first ciphertext may include preprocessing based on a difference between the transformed first ciphertext and a value obtained by multiplying the first ciphertext by twice the order of the polynomial.

The generating of the target ciphertext may include generating the target ciphertext by adding the first ciphertext and the second ciphertext.

In another general aspect, there is provided an apparatus for modulus refresh of a ciphertext in homomorphic encryption, the apparatus including a receiver configured to receive a first ciphertext corresponding to a first modulus, a processor configured to generate a second ciphertext by performing a blind rotation on the first ciphertext, and generate a target ciphertext corresponding to a second modulus greater than the first modulus based on the first ciphertext and the second ciphertext.

The processor may be configured to perform homomorphic operation-based preprocessing on the first ciphertext based on the first modulus and an order of a polynomial of the first ciphertext, and generate the second ciphertext by performing the blind rotation on the first ciphertext on which the homomorphic operation-based preprocessing is performed.

The processor may be configured to determine a transformed first modulus by transforming the first modulus based on the order of the polynomial, generate a third ciphertext by transforming the first ciphertext based on the transformed first modulus, and preprocess the first ciphertext based on the transformed first modulus and the third ciphertext.

The processor may be configured to preprocess based on dividing a difference between the first ciphertext and the third ciphertext by the transformed first modulus.

The processor may be configured to extract a learning with error (LWE) vector based on a coefficient of the first ciphertext on which the homomorphic operation-based preprocessing is performed, and generate the second ciphertext by performing the blind rotation based on the LWE vector.

The processor may be configured to generate an encryption constant based on a secret key used to generate the first ciphertext, generate a blind rotation key based on the encryption constant, and generate the second ciphertext by performing the blind rotation based on the blind rotation key.

The processor may be configured to generate blind rotation ciphertexts corresponding to the blind rotation key according to the order of the polynomial of the first ciphertext, and generate the second ciphertext by combining the blind rotation ciphertexts.

The processor may be configured to determine a transformed first modulus by transforming the first modulus based on the order of the polynomial, generate a third ciphertext by transforming the first ciphertext based on the transformed first modulus, and preprocess the first ciphertext by performing a rotation operation on the third ciphertext at intervals that are based on a number of plaintexts.

The processor may be configured to generate a transformed first ciphertext by transforming the first ciphertext based on the first modulus and the order of the polynomial, and preprocess the first ciphertext based on the transformed first ciphertext.

The processor may be configured to preprocess based on a difference between the transformed first ciphertext and a value obtained by multiplying the first ciphertext by twice the order of the polynomial.

The processor may be further configured to generate the target ciphertext by adding the first ciphertext and the second ciphertext.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular example embodiments only and is not to be limiting of the example embodiments. The singular forms "a", "an", and "the" are intended to include the plural forms as well, unless the context clearly indicates otherwise. As used herein, the term "and/or" includes anyone and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Although terms such as "first," "second," A, B, (a), or (b) are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described in the specification that one component is "connected," "coupled," "attached," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The use of the term "may" herein with respect to an example or embodiment (e.g., as to what an example or embodiment may include or implement) means that at least one example or embodiment exists where such a feature is included or implemented, while all examples are not limited thereto.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 1:
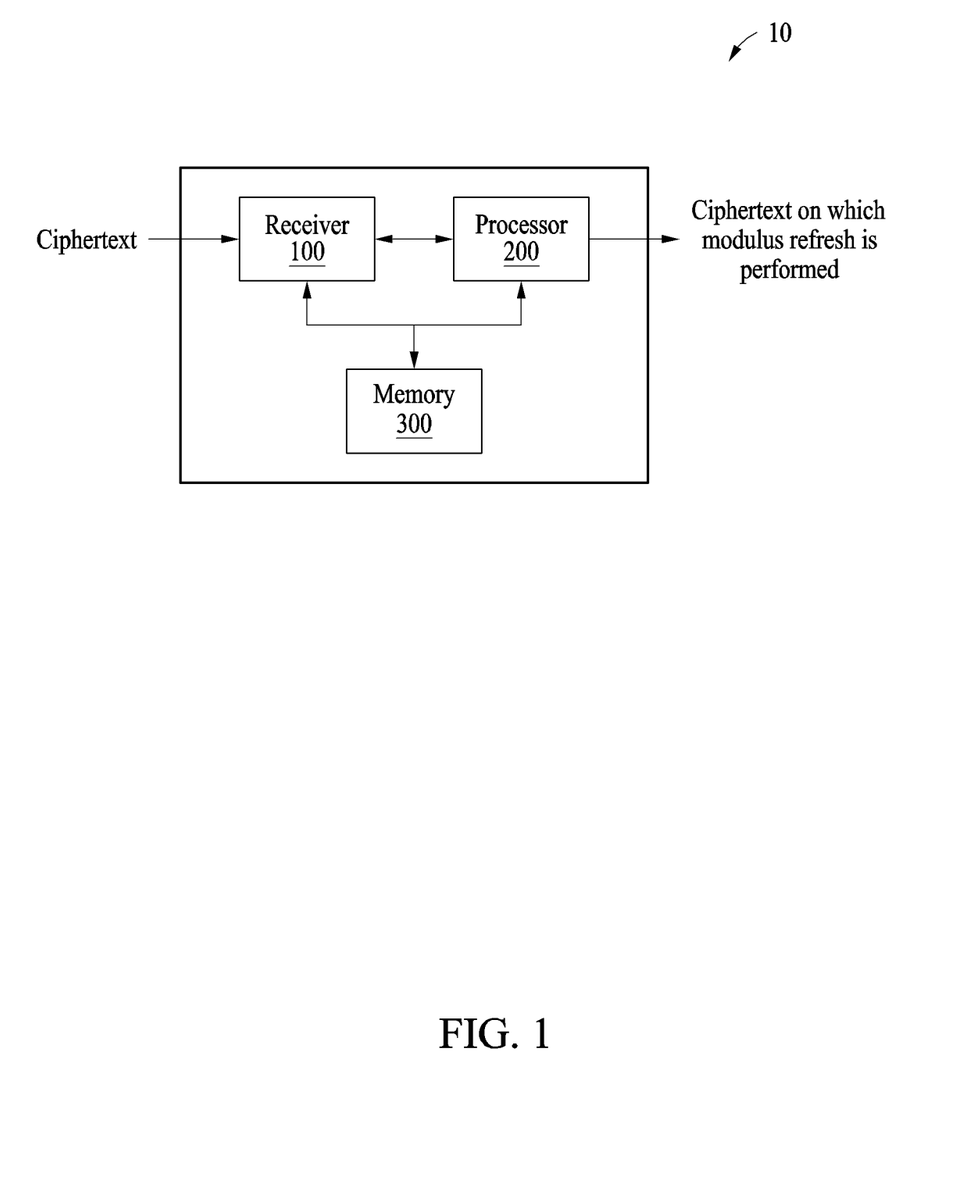
FIG. 1 illustrates an example of a modulus refresh apparatus.

FIG. 1 illustrates an example of a modulus refresh apparatus.

Referring to FIG. 1, a modulus refresh apparatus 10 may perform modulus refresh on a ciphertext corresponding to data. The modulus refresh apparatus 10 may receive encrypted data generated through data encryption. Hereinafter, encrypted data or encrypted text may be referred to as a ciphertext. The ciphertext may be in the form of a polynomial or a vector including a polynomial. Data or a message before encryption may be referred to as a plaintext.

The modulus refresh apparatus 10 may provide an encryption technique for performing an operation on data encrypted using homomorphic encryption dealing with integers and real numbers without decryption. For example, the modulus refresh apparatus 10 may decrypt a result of operating data encrypted using homomorphic encryption, thereby deriving the same result as an operation on data in a plaintext. The modulus refresh apparatus 10 may provide homomorphic encryption operations for arbitrary real or complex numbers.

The modulus refresh apparatus 10 may perform modulus refresh that is needed for homomorphic encryption. When an operation is performed using a ciphertext generated using homomorphic encryption, a modulus value corresponding to the ciphertext may be reduced. The modulus refresh may refer to an operation of changing a reduced modulus to a larger modulus to perform more ciphertext operations.

The modulus refresh apparatus 10 may perform an encryption process of encrypting an input value in an arbitrary device and service using homomorphic encryption. The modulus refresh apparatus 10 may perform encryption using an approximate homomorphic encryption that calculates a ciphertext of a plaintext including real numbers. The modulus refresh apparatus 10 may perform an encryption operation using a ring learning with error (RLWE)-based approximate homomorphic encryption that supports a ciphertext operation of a plaintext including real numbers.

The modulus refresh apparatus 10 may perform an encryption process of encrypting an input value in privacy preserving machine learning (PPML) and application services. The modulus refresh apparatus 10 may not greatly increase an error after performing modulus refresh and thus, may be applied to encryption services requiring high accuracy bits.

The modulus refresh apparatus 10 may perform modulus refresh of a ciphertext without level consumption. The modulus refresh apparatus 10 may obtain an accurate result in an operation using the ciphertext even after the modulus refresh is performed. The modulus refresh apparatus 10 has no level consumption, and thus, may use a polynomial of a low order in the encryption process.

The modulus refresh apparatus 10 may be implemented in the form of a chip and mounted on a hardware accelerator that utilizes homomorphic encryption. In addition, the modulus refresh apparatus 10 may be implemented in a personal computer (PC), a data server, a mobile device, a home appliance such as a television, a digital television (DTV), a smart television, a refrigerator, a smart home device, a vehicle such as a smart vehicle, an Internet of Things (IoT) device, or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a speaker, a personal navigation device or portable navigation device (PND), a handheld game console, an e-book, or a smart device. The smart device may be implemented as a smart watch, a smart band, or a smart ring.

The modulus refresh apparatus 10 includes a receiver 100 and a processor 200. The modulus refresh apparatus 10 may further include a memory 300.

The receiver 100 may include a receiving interface. The receiver 100 may receive data. The receiver 100 may receive a plaintext or a ciphertext. The ciphertext may have a modulus corresponding to the ciphertext. The receiver 100 may output the received plaintext or ciphertext to the processor 200.

The processor 200 may process data stored in the memory 300. The processor 200 may execute a computer-readable code (for example, software) stored in the memory 300 and instructions triggered by the processor 200.

The "processor 200" may be a data processing device implemented by hardware including a circuit having a physical structure to perform desired operations. For example, the desired operations may include code or instructions included in a program.

For example, the hardware-implemented data processing device may include a microprocessor, a single processor, an independent processors, a parallel processors, a single-instruction single-data (SISD) multiprocessing, a single-instruction multiple-data (SIMD) multiprocessing, a multiple-instruction single-data (MISD) multiprocessing, a multiple-instruction multiple-data (MIMD) multiprocessing, a microcomputer, a processor core, a multi-core processor, a multiprocessor, a central processing unit (CPU), a neural processing unit (NPU), a graphics processing unit (GPU), a tensor processing unit (TPU), a digital signal processor (DSP), a controller and an arithmetic logic unit (ALU), a field-programmable gate array (FPGA), an application-specific integrated circuit (ASIC), a programmable logic unit (PLU), or an application processor (AP).

The processor 200 may perform modulus refresh necessary for encryption using homomorphic encryption. The processor 200 may receive a first ciphertext corresponding to a first modulus, generated by encrypting the data.

The processor 200 may generate a second ciphertext by performing a blind rotation operation (e.g., a look-up table (LUT) operation) on the first ciphertext. The processor 200 may perform homomorphic operation-based preprocessing on the first ciphertext based on the first modulus and an order of a polynomial of the first ciphertext. The processor 200 may calculate a transformed first modulus by transforming the first modulus based on the order of the polynomial. The processor 200 may generate a third ciphertext by transforming the first ciphertext based on the transformed first modulus. The processor 200 may perform preprocessing on the first ciphertext by performing a rotation operation on the third ciphertext at intervals that are based on the number of plaintexts. The rotation operation will be described in detail with reference to FIG. 4.

The processor 200 may calculate the transformed first modulus by transforming the first modulus based on the order of the polynomial. The processor 200 may generate a third ciphertext by transforming the first ciphertext based on the transformed first modulus.

The processor 200 may perform preprocessing on the first ciphertext based on the transformed first modulus and the third ciphertext. The processor 200 may perform the preprocessing by dividing a difference between the first ciphertext and the third ciphertext by the transformed first modulus.

The processor 200 may generate a transformed first ciphertext by transforming the first ciphertext based on the first modulus and the order of the polynomial. The processor 200 may perform preprocessing on the first ciphertext based on the transformed first ciphertext. The processor 200 may perform the preprocessing based on a difference between the transformed first ciphertext and a value obtained by multiplying the first ciphertext by twice the order of the polynomial.

The processor 200 may generate the second ciphertext by performing the blind rotation operation on the first ciphertext on which the homomorphic operation-based preprocessing is performed. The processor 200 may extract a learning with error (LWE) vector based on a coefficient of the first ciphertext on which the homomorphic operation-based preprocessing is performed. The process of extracting the LWE vector will be described in more detail with reference to FIG. 3.

The processor 200 may generate the second ciphertext by performing the blind rotation operation based on the LWE vector. The processor 200 may generate an encryption constant based on a secret key used to generate the first ciphertext. The processor 200 may generate a blind rotation key based on the encryption constant. The processor 200 may generate the second ciphertext by performing the blind rotation operation based on the blind rotation key.

The processor 200 may generate a plurality of blind rotation ciphertexts corresponding to the blind rotation key according to the order of the polynomial of the first ciphertext. The processor 200 may generate the second ciphertext by combining the plurality of blind rotation ciphertexts. The blind rotation operation will be described in more detail with reference to FIG. 3.

The processor 200 may generate a target ciphertext corresponding to a second modulus greater than the first modulus based on the first ciphertext and the second ciphertext. The processor 200 may generate the target ciphertext by adding the first ciphertext and the second ciphertext.

The memory 300 stores instructions (or programs) executable by the processor 200. For example, the instructions include instructions to perform an operation of the processor 200 and/or an operation of each element of the processor 200.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
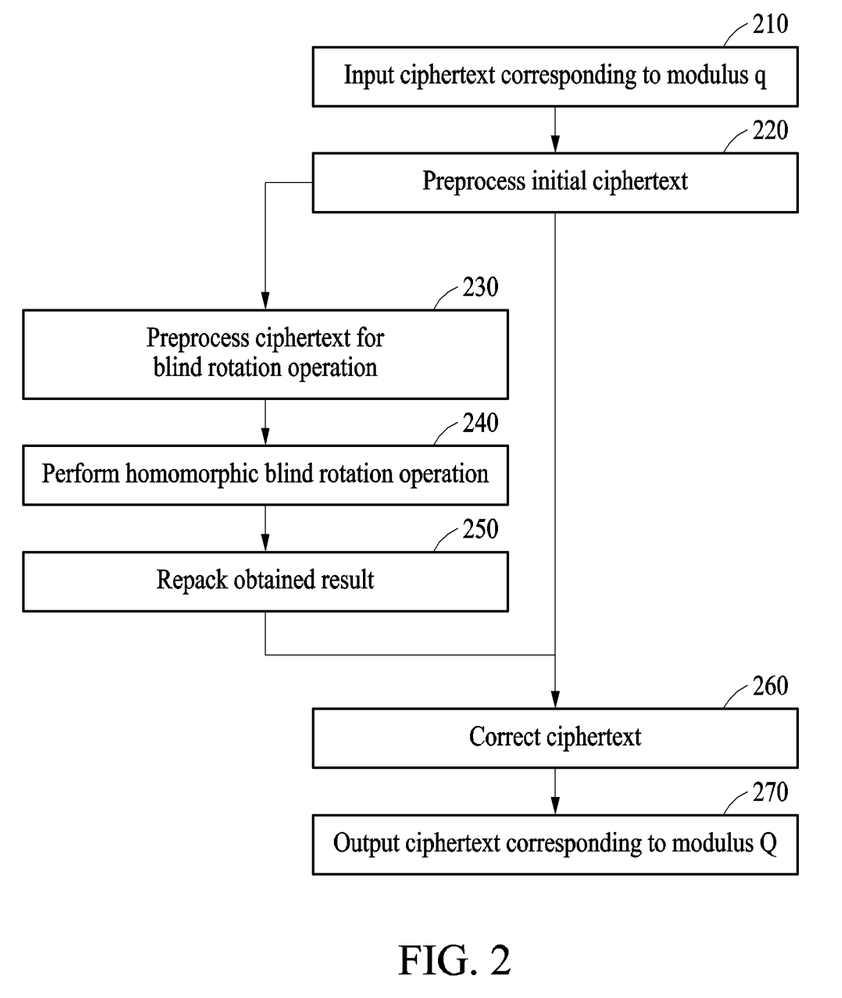
FIG. 2 illustrates an example of a modulus refresh operation of the modulus refresh apparatus of FIG. 1.

FIG. 2 illustrates an example of a modulus refresh operation of the modulus refresh apparatus of FIG. 1. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, the processor 200 may perform modulus refresh in an encryption process using homomorphic encryption. The processor 200 may generate a ciphertext with an increased modulus by performing modulus refresh.

In homomorphic encryption, a plaintext and a ciphertext may have the form of an Nth-order polynomial in which a coefficient for an arbitrary integer q is an integer on a modulus q. N may be an integer greater than or equal to "1".

When a homomorphic operation is performed, a modulus of a ciphertext is reduced. Thus, to perform a repetitive homomorphic operation, a process of refreshing the reduced modulus to a larger modulus may be needed.

In operation 210, the processor 200 may receive a ciphertext on a modulus q as an input. The ciphertext on the modulus q may correspond to the first ciphertext described with reference to FIG. 1.

In operation 220, the processor 200 may perform preprocessing on the initial ciphertext (e.g., the first ciphertext). For example, the processor 200 may perform preprocessing on the first ciphertext based on a first modulus and an order of a polynomial of the first ciphertext. The preprocessing process will be described in detail with reference to the examples of FIGS. 3 to 5.

In operation 230, the processor 220 may perform preprocessing on a ciphertext (e.g., a third ciphertext) for a blind rotation operation. The processor 200 may perform preprocessing on the first ciphertext based on a transformed first modulus and the third ciphertext. In other words, the processor 200 may transform the first ciphertext into a form suitable for performing the blind rotation operation.

In operation 240, the processor 200 may perform a blind rotation operation (e.g., a homomorphic LUT operation) on the preprocessed first ciphertext. In operation 250, the processor 200 may generate a second ciphertext by combining (or repacking) the first ciphertext on which the blind rotation operation is performed.

In operation 260, the processor 200 may correct the first ciphertext (or the third ciphertext) using the second ciphertext. In operation 270, the Processor 200 may output a ciphertext on a modulus Q, where Q is greater than q.

Figure 3:
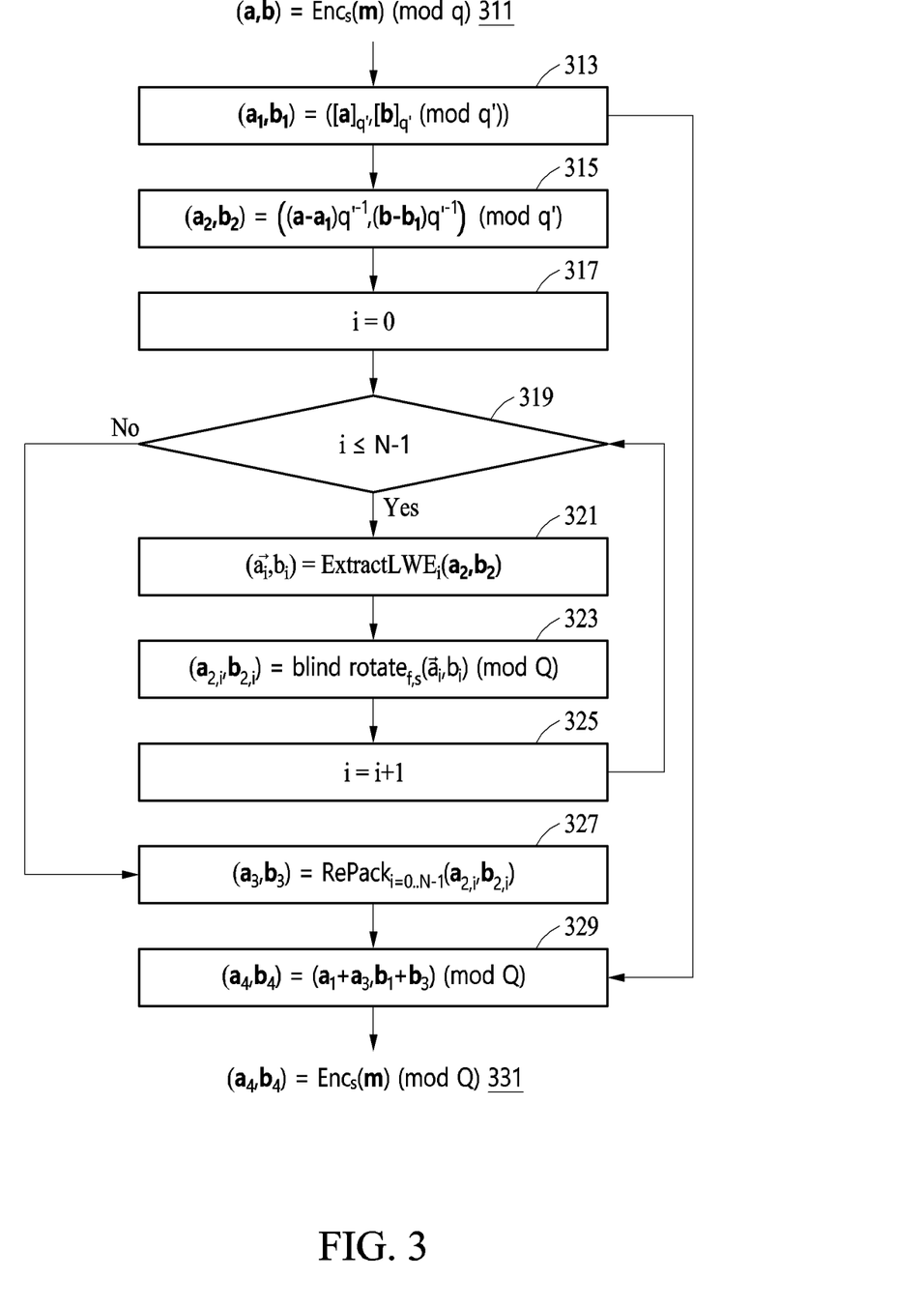
FIG. 3 illustrates an example of implementing ciphertext generation using the modulus refresh operation of FIG. 2.

FIG. 3 illustrates an example of implementing ciphertext generation using the modulus refresh operation of FIG. 2. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 311, a processor (e.g., the processor 200 of FIG. 1) may receive a first ciphertext. The processor 200 may perform modulus refresh on the first ciphertext satisfying $a \cdot s + b = +e \pmod{q}$ for a secret key $s$ with coefficients $\{-1, 0, 1\}$ and a first ciphertext $(a, b)$, thereby increasing a modulus $q$ of an input ciphertext to a modulus $Q$ of an output ciphertext. In this case, an order $N$ of a polynomial of the ciphertext may be a power of "2" and satisfy $2N|q$.

In the following equations, alphabets marked in bold may be N-th order polynomials, and alphabets not in bold may be normal numbers such as integers or real numbers. "·" may be a multiplication operation between polynomials, mod may be a remainder operation, and x|y may be a condition in which y is divisible by x. a mod q may denote performing an operation mod q on all coefficients of a polynomial and may be expressed as $[a]_q$.

The first ciphertext may be $(a, b) \in R_q^2$, and a decryption process may be expressed as $a \cdot s + b = m + e \pmod{q}$. The decryption process may be expressed as $a \cdot s + b = m + e + q \cdot v$ on real numbers. $Enc_s(m)$ may be a ciphertext obtained by encrypting a message m using a secret key s.

In operation 313, the processor 200 may perform preprocessing on the first ciphertext based on a first modulus and an order of a polynomial of the first ciphertext. The processor 200 may calculate a transformed first modulus by transforming the first modulus. The processor 200 may generate a third ciphertext by transforming the first ciphertext based on the transformed first modulus. The processor 200 may obtain $(a_1, b_1) = ([a]_{q'}, [b]_{q'}) \in R_{q'}^2$ by performing an operation modulus $q' = q/2N$ on the first ciphertext $(a,b) \in R_q^2$. $(a_1, b_1) \in R_{q'}^2$ may be expressed as $a_1 \cdot s + b_1 = m + e_1 + q' \cdot u$ on real numbers.

In operation 315, the processor 200 may perform preprocessing on the first ciphertext based on the transformed first modulus and the third ciphertext. The processor 200 may perform the preprocessing by dividing a difference between the first ciphertext and the third ciphertext by the transformed first modulus. The processor 200 may obtain the preprocessed first ciphertext by subtracting the third ciphertext $(a_1, b_1)$ from the first ciphertext $(a, b)$ and dividing the result value by the transformed first modulus $q'$. The preprocessed first ciphertext may be expressed as $a_2 \cdot s + b_2 = -u + 2N \cdot v$ on real numbers.

In operation 317, the processor 200 may substitute "0" for a loop index i to repeatedly perform a blind rotation operation. The processor 200 may repeatedly perform the blind rotation operation by repeatedly performing operations 319 to 325. For the repeated blind rotation operation, the processor 200 may determine whether i is less than or equal to N−1, in operation 319. The processor 200 may perform operation 321 if i is less than or equal to N−1, and may perform operation 327 if i is greater than N−1.

The processor 200 may generate the second ciphertext by performing the blind rotation operation on the preprocessed first ciphertext. In operation 321, the processor 200 may extract an LWE vector based on a coefficient of the preprocessed first ciphertext. $ExtractLWE_i(a, b)$ may be a function for extracting the LWE vector in the form of $(\vec{a}_i = (a_i, a_{i-1}, \ldots, a_0, -a_{N-1}, -a_{N-2}, \ldots, -a_{i+1}), b_i)$ using polynomials $a = a_0 + a_1 X + \ldots + a_{N-1} X^{N-1}$ and $b = b_0 + b_1 X + \ldots + b_{N-1} X^{N-1}$.

$a_2 \cdot s + b_2 = -u + 2N \cdot v$ may satisfy $a_2 \cdot s + b_2 = -u \pmod{2N}$ on a modulus $2N$. Here, coefficients of $u = u_0 + u_1 X + \ldots + u_{N-1} X^{N-1}$ may be expressed as coefficients of polynomials $a_2 = a_0 + a_1 X + \ldots + a_{N-1} X^{N-1}$ and $b_2 = b_0 + b_1 X + \ldots + b_{N-1} X^{N-1}$. When $\vec{s} = (s_0, s_1, \ldots, s_{N-1})$ denotes a coefficient vector of the secret key S, the processor 200 may define coefficients extracted from $a_2$ as $\vec{a}_i = (a_i, a_{i-1}, \ldots, a_0, -a_{N-1}, -a_{N-1}, \ldots, -a_{i+1})$. In this case, $\vec{a}_i \cdot \vec{s} + b_i = -u_i \pmod{2N}$ may be satisfied for $i \in \{0, \ldots, N-1\}$.

In operation 323, the processor 200 may perform a blind rotation operation based on the LWE vector.

The processor 200 may generate a second ciphertext $(a_3, b_3) \in R_Q^2$ by performing an operation using a function $f(X) = -\Sum_{u=-c}^{c} uq \cdot X^u$ on the preprocessed first $(a_2, b_2) \in R_{2N}^2$. The second ciphertext $(a_3, b_3) \in R_Q^2$ may satisfy $a_3 \cdot s + b_3 = -u \cdot q' + e_3 \pmod{Q}$. $LUT_{f,s}(\vec{a}, b)$ may be an operation of performing a blind rotation operation on the function f and the secret key s.

The processor 200 may generate a blind rotation key. The processor 200 may generate an encryption constant based on a secret key used to generate the first ciphertext.

The processor 200 may generate encryption constants $s_j^+$ and $s_j^-$ for the coefficients $s_j \in \{-1, 0, 1\}$ of the secret key s, according to the conditions described below. If $s_j = 1$, the processor 200 may generate the encryption constants as $s_j^+ = 1$ and $s_j^- = 0$. If $s_j = 0$, the processor 200 may generate the encryption constants as $s_j^+ = 0$ and $s_j^- = 0$. If $s_j = -1$, the processor 200 may generate the encryption constants as $s_j^+ = 0$ and $s_j^- = 1$.

The processor 200 may generate the blind rotation key based on the encryption constant, and perform the blind rotation operation based on the blind rotation key. For example, the processor 200 may generate a ring Gentry, Sahai, Waters (RGSW) ciphertext for a polynomial with constant terms $s_j^+$ and $s_j^-$ and use the RGSW ciphertext as the blind rotation key. The blind rotation key including the RGSW ciphertext may be expressed as $\{RGSW(s_j^+), RGSW(s_j^-)\}_{j=[0,N-1]}$.

The processor 200 may generate the RGSW ciphertext using a ring learning with error (RLWE) ciphertext. The RLWE ciphertext of a message m for the secret key s may be defined as $RLWE(m) = (a, a \cdot s + e + m)$. Here, a may be a polynomial with a coefficient on the modulus q, and e may be an error polynomial with a small coefficient. The processor 200 may randomly generate a and e at every encryption.

The processor 200 may define an RLWE' ciphertext of the message m for s as $RLWE'(m) = (RLWE(g_0 \cdot m), RLWE$ ($g_1 \cdot m$), ..., RLWE($g_{d-1} \cdot m$)). Here, ($g_0, g_1, \ldots, g_{d-1}$) may be a vector defined in advance for decomposing an arbitrary integer, may have the form of (1, B, $B^2, \ldots, B^{d-1}$) for an arbitrary integer B or may be set to ($\overline{Q}_0 \cdot [\overline{Q}_0^{-1}]_{q_0}, \ldots, \overline{Q}_{d-1} \cdot [\overline{Q}_{d-1}^{-1}]_{q_{d-1}}$) for $\overline{Q}_i = Q/q_i$. Finally, the processor 200 may define the RGSW ciphertext of the message m for the secret key s as RGSW(m)=(RLWE'(−sm),RLWE'(m)).

The processor 200 may perform the blind rotation operation on each coefficient $u_i$ using ($\overline{a}_i, b_i$). The processor 200 may define the function $f$ as $f(X)=\sum_{l=-c}^{c} q l \cdot X^l$, and perform initialization to $ACC_0 \leftarrow f(X) \cdot X^{b_i}$. The processor 200 may obtain a ciphertext $ACC_N=(a_i', b_i') \in R_Q^2$ for $m_i=-qu_i+d_1 \cdot X+ \ldots +d_{N-1} \cdot X^{N-1}$ by repeatedly performing $ACC_{j+1} \leftarrow ACC_j \cdot (1+(X^{a_j}-1) \cdot RGSW(s_j^+)+(X^{-a_j}-1) \cdot RGSW(s_j^-))$ for all $j \in \{0, \ldots, N-1\}$.

In operation 325, the processor 200 may add "1" to the loop index i.

In operation 327, the processor 200 may generate the second ciphertext by combining or repacking the first ciphertexts on which the blind rotation operation is performed. RePack$_{i=0 \ldots N-1}(a_i, b_i)$ may be an operation of combining a plurality of ciphertext polynomials into one polynomial. The processor 200 may obtain ciphertexts for $m_0, \ldots, m_{N-1}$ by repeating the blind rotation operation N times, and then combine the obtained ciphertexts into the second ciphertext ($a_3, b_3) \in R_Q^2$ for $m=-(qu_0+qu_1 X+ \ldots +qu_{N-1} X^{N-1})$.

In operation 329, the processor 200 may generate a target ciphertext by correcting the first ciphertext using the second ciphertext. For example, the processor 200 may obtain the target ciphertext ($a_4, b_4) \in R_Q^2$ for ($a_1, b_1) \in R_q^2$ and ($a_3, b_3) \in R_Q^2$. ($a_4, b_4) \in R_Q^2$ may be expressed as $a_4 \cdot s+b_4=m+e_1+e_3 \pmod{Q}$.

In operation 331, the processor 200 may output the target ciphertext with the modulus increased to Q for the message m.

Figure 4:
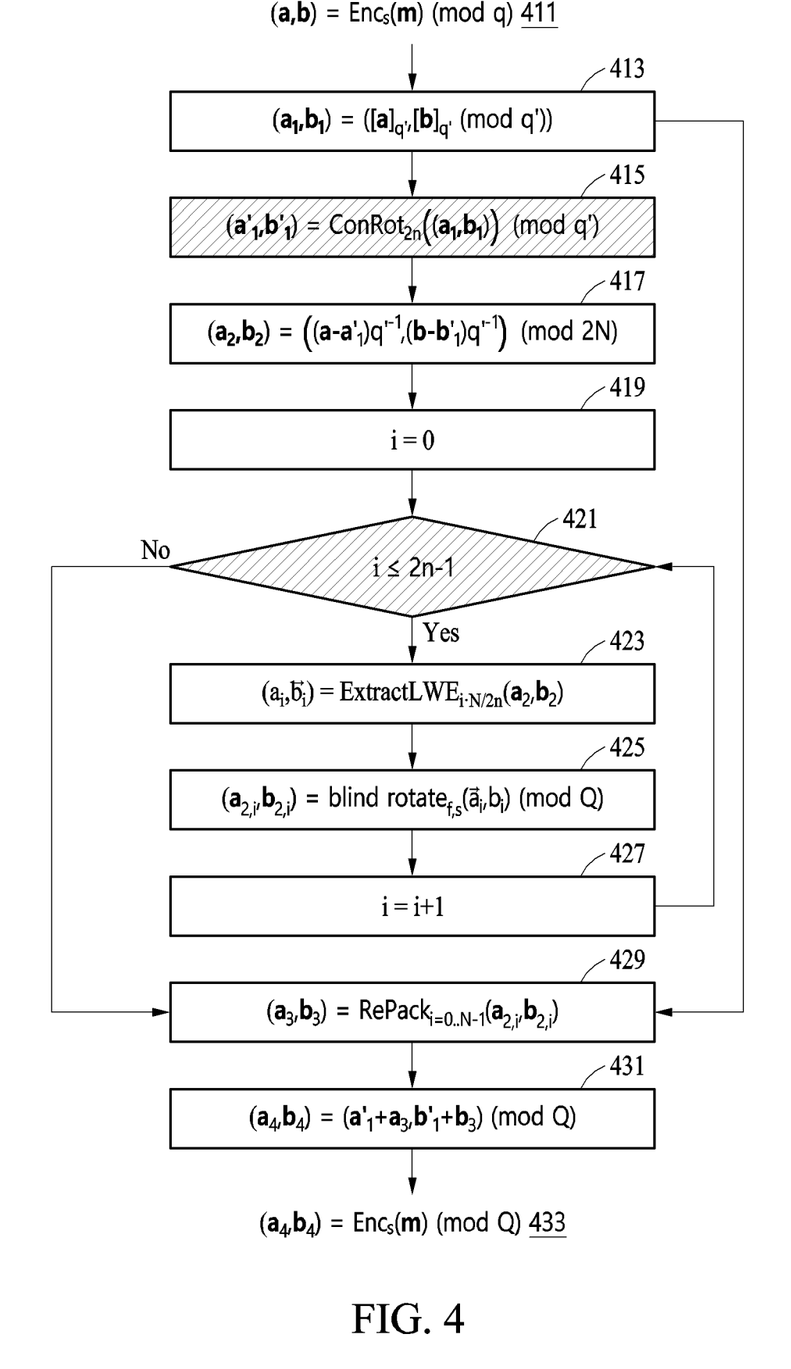
FIG. 4 illustrates an example of implementing ciphertext generation using the modulus refresh operation of FIG. 2.

FIG. 4 illustrates an example of implementing ciphertext generation using the modulus refresh operation of FIG. 2. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 411, a processor (e.g., the processor 200 of FIG. 1) may receive a first ciphertext. The processor 200 may calculate a transformed first modulus by transforming the first modulus based on the order of the polynomial. The processor 200 may generate a third ciphertext by transforming the first ciphertext based on the transformed first modulus. In operation 415, the processor 200 may perform a rotation operation on the third ciphertext at intervals that are based on the number of plaintexts. Hereinafter, the rotation operation process will be described in detail.

In homomorphic encryption, up to N/2 messages in the form of ($z_0, \ldots, z_{N/2-1}$) may be encoded and encrypted in the form of $m=m_0+m_1 X+ \ldots +m_{N-1} X^{N-1}$ in a polynomial. If the number of messages n is less than N/2, only a portion of the total space N/2 is used. Thus, it may be referred to as sparse encoding.

If the number of messages n is less than N/2, only a portion of the total space N/2 is used. Thus, it may be referred to as sparse encoding, and the polynomial may include some coefficients being "0" as in $m=m_0+m_1 X^{N/2n}+m_2 X^{N/n}+ \ldots +m_{2n-1} X^{N(2n-1)/n}$. In this case, the processor 200 may reduce the amount of computation by performing a blind rotation operation only on $u_i$ that is non-zero among the coefficients of u.

The processor 200 may receive, as an input, a ciphertext (e.g., the first ciphertext) on a modulus q for a message m to perform modulus refresh on the sparsely encoded ciphertext, and finally output a ciphertext (e.g., the target ciphertext) on a modulus Q for the message m.

The processor 200 may perform a modified preprocessing process to process the sparsely encoded ciphertext. The processor 200 may obtain ($a_2, b_2) \in R_{q'}^2$ by sequentially performing a rotation operation ConRot$_{2n}$ on the ciphertext ($a_1, b_1) \in R_{q'}^2$ at intervals of N/2, N/4, ... 2n. ($a_2, b_2) \in R_{q'}^2$ may be expressed as $$a_2 \cdot s + b_2 = \frac{N}{2n} \cdot m + \frac{N}{2n} \cdot e_2 + e_{rot} + \frac{N}{2n} q' \cdot u'.$$

Also, u' may be configured as $u'=u_0++u_1 X^{N/2n}+u_2 X^{N/n}+ \ldots +u_{2n-1} X^{N(2n-1)/n}$.

Unlike the blind rotation operation process in the example of FIG. 3 in which the blind rotation operation is performed for all coefficients $u_i$, the processor 200 may obtain 2n ciphertexts by performing the blind rotation operation only for non-zero coefficients $u_i$ and generate the second ciphertext by combining the obtained 2n ciphertexts. In the case of full encoding in which the number of messages is N/2, the processor 200 may perform N blind rotation operations and combines N ciphertexts. Meanwhile, in the case of sparse encoding, the processor 200 may efficiently perform the operation through 2n blind rotation operations and a combination of 2n ciphertexts.

In operation 417, the processor 200 may perform preprocessing on the first ciphertext based on a transformed first modulus and the third ciphertext. Operation 417 may be the same as operation 315 of FIG. 3.

In operation 419, the processor 200 may substitute "0" for a loop index i to repeatedly perform a blind rotation operation. The processor 200 may repeatedly perform the blind rotation operation by repeatedly performing operations 421 to 427. For the repeated blind rotation operation, the processor 200 may determine whether i is less than or equal to 2n−1, in operation 421. The processor 200 may perform operation 423 if i is less than or equal to 2n−1, and may perform operation 429 if i is greater than 2n−1.

The processor 200 may generate the second ciphertext by performing the blind rotation operation on the preprocessed first ciphertext. In operation 423, the processor 200 may extract an LWE vector based on a coefficient of the preprocessed first ciphertext. Operation 423 may be the same as operation 321 of FIG. 3.

In operation 425, the processor 200 may perform a blind rotation operation based on the LWE vector. Operation 425 may be the same as operation 323 of FIG. 3. In operation 427, the processor 200 may add "1" to the loop index i.

In operation 429, the processor 200 may generate the second ciphertext by combining or repacking the first ciphertexts on which the blind rotation operation is performed. Operation 429 may be the same as operation 327 of FIG. 3.

In operation 431, the processor 200 may generate a target ciphertext by correcting the first ciphertext using the second ciphertext. In operation 433, the processor 200 may output the target ciphertext with the modulus increased to Q for the message M. Operation 431 may be the same as operation 329 of FIG. 3, and operation 433 may be the same as operation 331 of FIG. 3.

Figure 5:
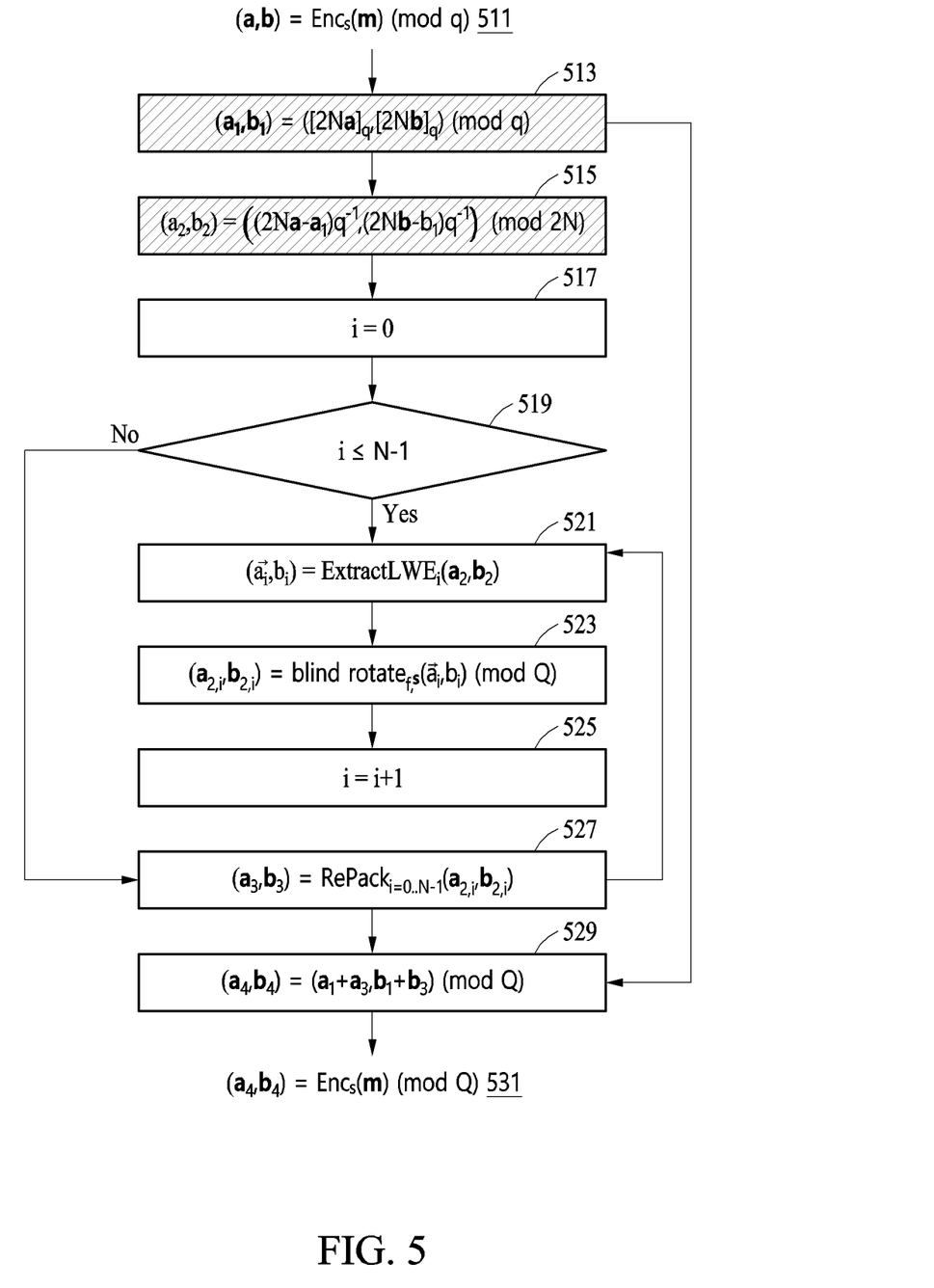
FIG. 5 illustrates an example of implementing ciphertext generation using the modulus refresh operation of FIG. 2.

FIG. 5 illustrates an example of implementing ciphertext generation using the modulus refresh operation of FIG. 2. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 511, a processor (e.g., the processor 200 of FIG. 1) may receive a first ciphertext. The processor 200 may perform preprocessing on the first ciphertext based on a first modulus and an order of a polynomial of the first ciphertext.

The processor 200 may perform preprocessing on a transformed first ciphertext by transforming the first ciphertext based on the first modulus and the order of the polynomial. The processor 200 may perform preprocessing on the first ciphertext based on the transformed first ciphertext. The processor 200 may perform the preprocessing based on a difference between the transformed first ciphertext and a value obtained by multiplying the first ciphertext by twice the order of the polynomial.

The processor 200 may perform a modified preprocessing process to process a residue number system (RNS) architecture not satisfying 2N|q. In operation 513, the processor 200 may generate a third ciphertext by transforming the first ciphertext. In operation 515, the processor 200 may perform a preprocessed first ciphertext by performing preprocessing based on the first ciphertext, the third ciphertext, and the order of the polynomial. Hereinafter, the modified preprocessing process will be described.

In homomorphic encryption, a ciphertext may be expressed as a ciphertext on a modulus for $Q = q_1 \cdot q_2 \ldots q_L$, which is the product of arbitrarily small primes $q_i$. In this case, the processor 200 may divide the ciphertext corresponding to Q into ciphertexts on modulus for each $q_i$. This architecture may be referred to as the residue number system described above, and since the residue number system does not satisfy 2N|q, the processor 200 may modify the preprocessing process to process the residue number system.

The processor 200 may obtain $(a_1, b_1) = ([2N \cdot a]_{q'}, [2N \cdot b]_{q'}) \in R_q^2$ by multiplying the first ciphertext $(a, b) \in R_q^2$ by 2N and then performing an operation of modulus q'. The transformed ciphertext $(a_1, b_1) \in R_q^2$ may be expressed as $a_1 \cdot s + b_1 = m + e_1 + q_1 \cdot u$ on real numbers.

The processor 200 may obtain $(a_2, b_2) = ((a - a_1)/q, (b - b_1)/q) \in R_{2N}^2$ by subtracting $(a_1, b_1)$ from the ciphertext $(2N \cdot a, 2N \cdot b)$ and then dividing the result value by q. The preprocessed ciphertext $(a_2, b_2) \in R_{2N}^2$ may be expressed as $a_2 \cdot s + b_2 = -u + 2N \cdot v$ on real numbers.

In operation 517, the processor 200 may substitute "0" for a loop index i to repeatedly perform a blind rotation operation. The processor 200 may repeatedly perform the blind rotation operation by repeatedly performing operations 519 to 527. For the repeated blind rotation operation, the processor 200 may determine whether i is less than or equal to N−1, in operation 519. The processor 200 may perform operation 521 if i is less than or equal to N−1, and may perform operation 527 if i is greater than N−1.

The processor 200 may generate the second ciphertext by performing the blind rotation operation on the preprocessed first ciphertext. In operation 521, the processor 200 may extract an LWE vector based on a coefficient of the preprocessed first ciphertext. Operation 521 may be the same as operation 321 of FIG. 3.

In operation 523, the processor 200 may perform a blind rotation operation based on the LWE vector. Operation 523 may be the same as operation 323 of FIG. 3. In operation 525 the processor 200 may add "1" to the loop index i.

In operation 527, the processor 200 may generate the second ciphertext by combining or repacking the first ciphertexts on which the blind rotation operation is performed. Operation 527 may be the same as operation 327 of FIG. 3.

In operation 529, the processor 200 may generate a target ciphertext by correcting the first ciphertext using the second ciphertext. In operation 531, the processor 200 may output the target ciphertext with the modulus increased to Q for the message M. Operation 529 may be the same as operation 329 of FIG. 3, and operation 531 may be the same as operation 331 of FIG. 3.

Figure 6:
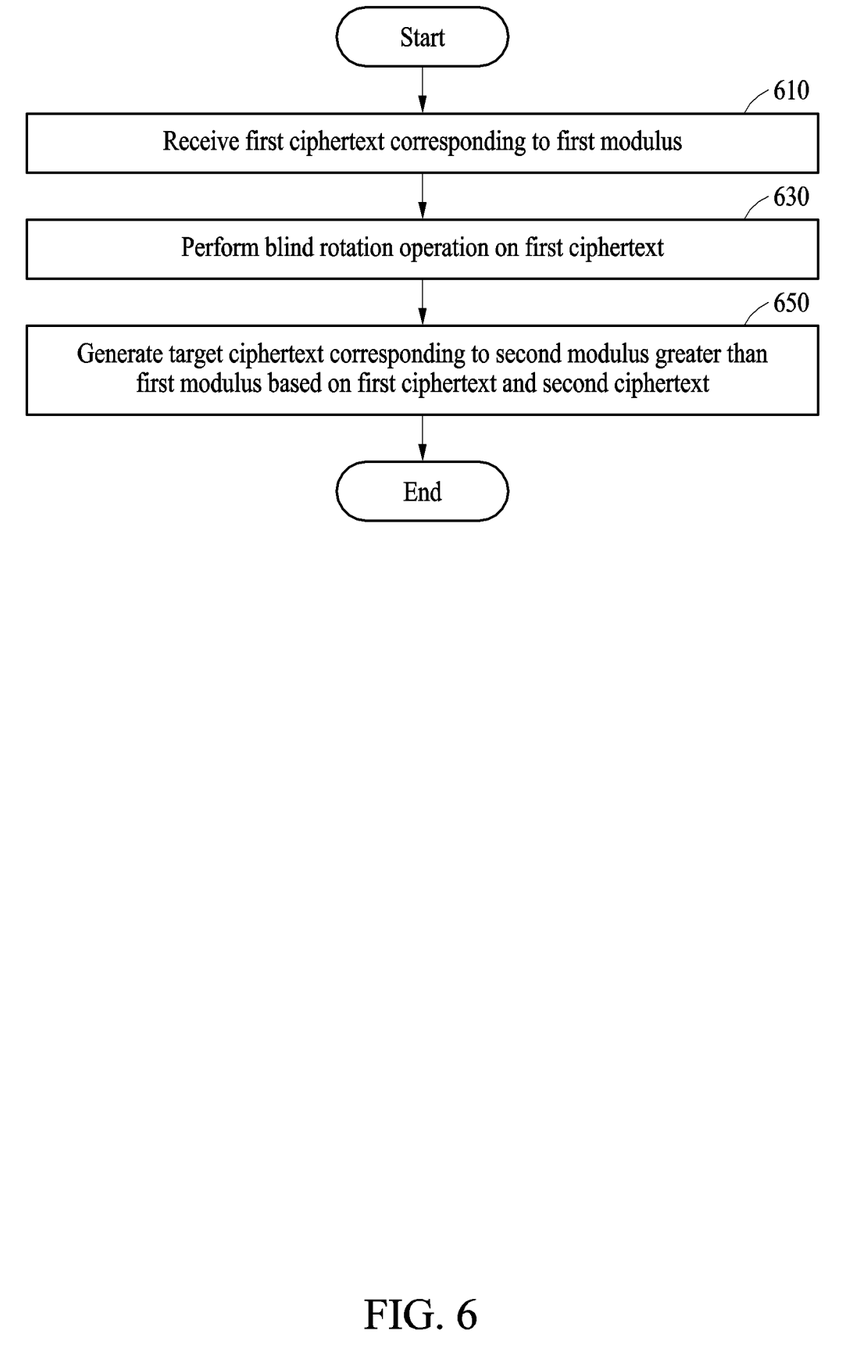
FIG. 6 illustrates an example of the operation of the modulus refresh apparatus of FIG. 1.

FIG. 6 illustrates an example of the operation of the modulus refresh apparatus of FIG. 1. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, a receiver (e.g., the receiver 100 of FIG. 1) may receive a first ciphertext corresponding to a first modulus. The receiver 100 may output the received first ciphertext to a processor (e.g., the processor 200 of FIG. 1).

The processor 200 may perform modulus refresh for a homomorphic encryption operation.

In operation 630, the processor 200 may generate a second ciphertext by performing a blind rotation operation on the first ciphertext. The processor 200 may perform homomorphic operation-based preprocessing on the first ciphertext based on the first modulus and an order of a polynomial of the first ciphertext. For example, the processor 200 may perform preprocessing on the first ciphertext by performing a rotation operation on the first ciphertext at intervals that are based on the order of the polynomial.

The processor 200 may calculate the transformed first modulus by transforming the first modulus based on the order of the polynomial. The processor 200 may generate a third ciphertext by transforming the first ciphertext based on the transformed first modulus.

The processor 200 may perform preprocessing on the first ciphertext based on a transformed first modulus and the third ciphertext. The processor 200 may perform the preprocessing by dividing a difference between the first ciphertext and the third ciphertext by the transformed first modulus.

The processor 200 may calculate the transformed first modulus by transforming the first modulus based on the order of the polynomial, and generate the third ciphertext by transforming the first ciphertext based on the transformed first modulus. The processor 200 may perform preprocessing on the first ciphertext by performing a rotation operation on the third ciphertext at intervals that are based on the number of plaintexts.

Alternatively, the processor 200 may generate a transformed first ciphertext by transforming the first ciphertext based on the first modulus and the order of the polynomial. The processor 200 may perform preprocessing on the first ciphertext based on the transformed first ciphertext. The processor 200 may perform the preprocessing based on a difference between the transformed first ciphertext and a value obtained by multiplying the first ciphertext by twice the order of the polynomial.

The processor 200 may generate the second ciphertext by performing the blind rotation operation on the preprocessed first ciphertext. The processor 200 may extract an LWE vector based on a coefficient of the preprocessed first ciphertext.

The processor 200 may generate the second ciphertext by performing the blind rotation operation based on the LWE vector. The processor 200 may generate an encryption constant based on a secret key used to generate the first ciphertext. The processor 200 may generate a blind rotation key based on the encryption constant. The processor 200 may generate the second ciphertext by performing the blind rotation operation based on the blind rotation key.

The processor 200 may generate a plurality of blind rotation ciphertexts corresponding to the blind rotation key according to the order of the polynomial of the first ciphertext. The processor 200 may generate the second ciphertext by combining the plurality of blind rotation ciphertexts.

In operation 650, the processor 200 may generate a target ciphertext corresponding to a second modulus greater than the first modulus based on the first ciphertext and the second ciphertext. The processor 200 may generate the target ciphertext by adding the first ciphertext and the second ciphertext.

As described above, methods are provided for achieving a high modulus and high accuracy through a direct approach for calculating a modulus function obtained as a result of modulus refresh.

The modulus refresh apparatus 10, receiver 100, and other apparatuses, units, modules, devices, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method for modulus refresh of a ciphertext in homomorphic encryption. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application it will be apparent that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for modulus refresh of a ciphertext in homomorphic encryption, the method comprising:
   receiving a first ciphertext corresponding to a first modulus;
   generating a second ciphertext by performing a blind rotation on the first ciphertext; and
   generating a target ciphertext corresponding to a second modulus greater than the first modulus based on the first ciphertext and the second ciphertext.

2. The method of claim 1, wherein the generating of the second ciphertext comprises:
   performing homomorphic operation-based preprocessing on the first ciphertext based on the first modulus and an order of a polynomial of the first ciphertext; and
   generating the second ciphertext by performing the blind rotation on the first ciphertext on which the homomorphic operation-based preprocessing is performed.

3. The method of claim 2, wherein the performing of the homomorphic operation-based preprocessing on the first ciphertext comprises:
   determining a transformed first modulus by transforming the first modulus based on the order of the polynomial;
   generating a third ciphertext by transforming the first ciphertext based on the transformed first modulus; and
   preprocessing the first ciphertext based on the transformed first modulus and the third ciphertext.

4. The method of claim 3, wherein the preprocessing of the first ciphertext based on the transformed first modulus and the third ciphertext comprises preprocessing by dividing a difference between the first ciphertext and the third ciphertext by the transformed first modulus.

5. The method of claim 2, wherein the generating of the second ciphertext by performing the blind rotation on the first ciphertext comprises:
   extracting a learning with error (LWE) vector based on a coefficient of the first ciphertext on which the homomorphic operation-based preprocessing is performed; and
   generating the second ciphertext by performing the blind rotation based on the LWE vector.

6. The method of claim 5, wherein the generating of the second ciphertext by performing the blind rotation based on the LWE vector comprises:
   generating an encryption constant based on a secret key used to generate the first ciphertext;
   generating a blind rotation key based on the encryption constant; and
   generating the second ciphertext by performing the blind rotation based on the blind rotation key.

7. The method of claim 6, wherein the generating of the second ciphertext by performing the blind rotation based on the blind rotation key comprises:
generating blind rotation ciphertexts corresponding to the blind rotation key according to the order of the polynomial of the first ciphertext; and
generating the second ciphertext by combining the blind rotation ciphertexts.

8. The method of claim 2, wherein the performing of the homomorphic operation-based preprocessing on the first ciphertext comprises:
determining a transformed first modulus by transforming the first modulus based on the order of the polynomial;
generating a third ciphertext by transforming the first ciphertext based on the transformed first modulus; and
preprocessing the first ciphertext by performing a rotation operation on the third ciphertext at intervals that are based on a number of plaintexts.

9. The method of claim 2, wherein the performing of the homomorphic operation-based preprocessing on the first ciphertext comprises:
generating a transformed first ciphertext by transforming the first ciphertext based on the first modulus and the order of the polynomial; and
preprocessing the first ciphertext based on the transformed first ciphertext.

10. The method of claim 9, wherein the preprocessing of the first ciphertext based on the transformed first ciphertext comprises preprocessing based on a difference between the transformed first ciphertext and a value obtained by multiplying the first ciphertext by twice the order of the polynomial.

11. The method of claim 1, wherein the generating of the target ciphertext comprises generating the target ciphertext by adding the first ciphertext and the second ciphertext.

12. An apparatus for modulus refresh of a ciphertext in homomorphic encryption, the apparatus comprising:
a receiver configured to receive a first ciphertext corresponding to a first modulus;
a processor configured to:
generate a second ciphertext by performing a blind rotation on the first ciphertext, and
generate a target ciphertext corresponding to a second modulus greater than the first modulus based on the first ciphertext and the second ciphertext.

13. The apparatus of claim 12, wherein the processor is further configured to:
perform homomorphic operation-based preprocessing on the first ciphertext based on the first modulus and an order of a polynomial of the first ciphertext, and
generate the second ciphertext by performing the blind rotation on the first ciphertext on which the homomorphic operation-based preprocessing is performed.

14. The apparatus of claim 13, wherein the processor is further configured to:
determine a transformed first modulus by transforming the first modulus based on the order of the polynomial,
generate a third ciphertext by transforming the first ciphertext based on the transformed first modulus, and
preprocess the first ciphertext based on the transformed first modulus and the third ciphertext.

15. The apparatus of claim 14, wherein the processor is further configured to preprocess based on dividing a difference between the first ciphertext and the third ciphertext by the transformed first modulus.

16. The apparatus of claim 13, wherein the processor is further configured to:
extract a learning with error (LWE) vector based on a coefficient of the first ciphertext on which the homomorphic operation-based preprocessing is performed, and
generate the second ciphertext by performing the blind rotation based on the LWE vector.

17. The apparatus of claim 16, wherein the processor is further configured to:
generate an encryption constant based on a secret key used to generate the first ciphertext,
generate a blind rotation key based on the encryption constant, and
generate the second ciphertext by performing the blind rotation based on the blind rotation key.

18. The apparatus of claim 17, wherein the processor is further configured to:
generate blind rotation ciphertexts corresponding to the blind rotation key according to the order of the polynomial of the first ciphertext, and
generate the second ciphertext by combining the blind rotation ciphertexts.

19. The apparatus of claim 13, wherein the processor is further configured to:
determine a transformed first modulus by transforming the first modulus based on the order of the polynomial,
generate a third ciphertext by transforming the first ciphertext based on the transformed first modulus, and
preprocess the first ciphertext by performing a rotation operation on the third ciphertext at intervals that are based on a number of plaintexts.

20. The apparatus of claim 13, wherein the processor is further configured to:
generate a transformed first ciphertext by transforming the first ciphertext based on the first modulus and the order of the polynomial, and
preprocess the first ciphertext based on the transformed first ciphertext.

21. The apparatus of claim 20, wherein the processor is further configured to preprocess based on a difference between the transformed first ciphertext and a value obtained by multiplying the first ciphertext by twice the order of the polynomial.

22. The apparatus of claim 12, wherein the processor is further configured to generate the target ciphertext by adding the first ciphertext and the second ciphertext.

* * * * *